United States Patent [19]

Dunne et al.

[11] 4,042,722

[45] Aug. 16, 1977

[54] ADDITIVES FOR ANIMAL FEEDS

[75] Inventors: Gerald J. Dunne; John D. Harvey, both of Baie d' Urfe, Canada

[73] Assignee: Delmar Chemicals Limited, Ville LaSalle, Canada

[21] Appl. No.: 522,871

[22] Filed: Nov. 11, 1974

[51] Int. Cl.² .............................................. A23K 1/00
[52] U.S. Cl. .................................... 426/648; 426/74; 426/658; 426/807
[58] Field of Search ............................. 426/2, 72–74, 426/220, 289, 806, 658, 648

[56] References Cited

U.S. PATENT DOCUMENTS

| 2,928,739 | 3/1960 | Harrel et al. | 426/74 |
| 3,244,527 | 4/1966 | Baker et al. | 426/74 |
| 3,600,189 | 8/1971 | Raynal et al. | 426/74 |

OTHER PUBLICATIONS

Hawley, "The Condensed Chemical Dictionary," Van Nostrand Reinhold Co., 8th Ed., 1971, p. 778.
Olson, et al., "The Stability of Inorganic Seleniumin Premixes," Poultry Science, vol. 52, pp. 403–406, 1973.

Primary Examiner—Raymond N. Jones
Assistant Examiner—R. B. Penland
Attorney, Agent, or Firm—Fisher, Christen & Sabol

[57] ABSTRACT

The present invention provides novel selenium containing additives for use as supplements in livestock feeds and processes for producing same. The novel supplements of the present invention use starch, especially wheat starch, as a carrier for the selenium-containing component and are remarkably homogeneous as regards distribution of the selenium content.

5 Claims, No Drawings

ADDITIVES FOR ANIMAL FEEDS

The present invention relates generally to a novel animal feed additive and to processes for producing same. More particularly, the present invention provides an animal feed supplement containing selenium, the supplement being useful for making up dietary deficiencies in animal feeds which are lacking this trace element.

BACKGROUND OF THE INVENTION

It is generally agreed that selenium is an essential trace element in livestock, such as poultry and swine, feeds. This is especially true in the case of feeds for young growing animals. While the element occurs naturally in most feed ingredients, its level in feeds such as cereal grains and soybeans is in most areas inadequate to meet the nutritional needs of livestock. Tests have shown that animals absorb dietary selenium according to bodily need and excrete any excess. However, because of the extremely low level at which selenium is to be added to feeds, the nutritional needs of the animals will be satisfied without causing any significant increase in selenium concentration in edible tissues or in the environment. Toxicologists in Canada and the United States have thoroughly evaluated all available scientific data and have concluded that in the amount permitted in feeds for livestock selenium would not constitute a hazard. On the contrary, it is considered that its use is more likely to have a beneficial effect on human health for the same reason that it improves the health of livestock.

However, like other essential trace elements, selenium is extremely toxic if consumed in excessive amounts. It will be readily appreciated therefore that such supplements must be more or less completely homogeneous, i.e., the small percentage of selenium must be distributed uniformly throughout the supplement. Indeed, feed manufacturers wishing to mix feeds, including premixes, containing added selenium may only do so provided the manufacturer can demonstrate competence in his ability to produce batches of selenium-containing supplement which have been proven to be homogeneous by the analysis of three samples taken at random from the batch.

Alternatively, micro-premix feeds containing added selenium and intended for sale to persons who are not required to demonstrate competence in mixing, such as the individual farmer, must be so formulated that not less than 10 pounds of the premix is required to be mixed per ton of complete feed. This added precaution is necessary because of the extremely small amounts of selenium in a feed and the absolute necessity for uniform distribution.

Prior art selenium-containing supplements utilize ground limestone as a carrier for the selenium components. However, with these materials it has proved impossible to obtain a product having a selenium content variability within acceptable limits. For example, a prior art supplement of this type containing 40 p.p.m. selenium typically has a coefficient of variation in the selenium content of 36% and a 20 p.p.m. supplement typically has a coefficient of variation of approximately 80%. Such variations in selenium content are not acceptable in practice when one considers the toxic nature of selenium.

It is an object of the present invention to provide an animal feed supplement having a low selenium content, the supplement being substantially homogeneous as regards distribution of the selenium content.

It is a further object of the present invention to provide a process for producing such a novel feed supplement.

STATEMENT OF INVENTION

It has now been found that by using an organic material namely, starch, and more particularly wheat starch, as a carrier for the selenium-containing component of the supplement a remarkably uniform and homogeneous supplement is possible.

The supplement according to the present invention is extremely reproducible as regards the concentration of selenium and its uniform distribution therethroughout.

The selenium-containing component is preferably sodium selenate or sodium selenite, these two materials being acceptable for certain livestock feed uses at the present time.

However, it is envisaged that other selenium-containing compounds, for example, alkali or alkaline earth compounds in general, such as calcium selenate and calcium selenite may also be used if and when clearance for such compounds has been obtained. Obviously, the other ions present in the selenium compounds must be substantially non-toxic to the animals and ions and, therefore, selenium compounds, falling within this category will be well known to one skilled in the art.

The selenium content of the feed supplement of the present invention may vary widely but is conveniently not more than 5000 ppm. The actual value varies and may be, for example, between 1000 and 5000 ppm; between 100 and 500 ppm., or up to 50 ppm. depending on various factors including the proposed use of the supplement.

Whilst not being bound to any specific theories, it is thought that the supplement of the present invention is not a simple admixture of the selenium compound with the starch carrier. There are indications that there is a stronger association in the form of a bonding of some type between the selenium compound and the starch material. In any event, the novel product of the present invention provides material advantages over prior art supplements and its actual specific constitution is not material to obtaining the advantages of the present invention.

The product of the present invention may be prepared by simply admixing the starch and selenium-containing component in powdered form, preferably in the presence of other desirable additives.

The components may be admixed in the dry state but preferably a solution of the selenium-containing component is added to the starch in solid form and the whole thoroughly mixed. In the latter case, a concentrated solution of selenium component is preferably used since it is desirable that the formed supplement is a definite solid product.

Moreover, additives may be included in the supplement conveniently at the mixing or blending stage such as surfactants and buffering agents to assist the blending/mixing of the components and also to stabilize the supplement when formed. Such an additive is tricalcium phosphate. Inclusion of this additive in the supplement has the additional advantage that calcium, a further desirable trace element, is thereby included in the supplement. However, compounds containing nutritionally desirable trace elements such as calcium, magnesium and so on may be included as separate components into the supplement.

The supplement may be prepared in one stage, i.e., after one mixing/blending step the supplement is complete as regards the desired selenium content and additive contents.

However, it is preferred that the preparation be effected in various stages involving a first stage where a concentrate or "premix" is formed and one or more further stages where the premix is diluted one or more times with, for example, further starch or an alternative diluent such as corn grits, rye middlings, etc., until the product has the desired selenium and trace element contents.

The present invention will be further described, but not limited by, reference to the following specific examples.

EXAMPLE 1

Preparation of a supplement containing 2000 p.p.m. selenium 10.5 Kgs of sodium selenate dissolved in about 20 liters of water were added to 375 Kgs of powdered wheat starch and 40 Kgs of tricalcium phosphate and these components mixed thoroughly in a blender for about 15 minutes. The product so obtained may be termed the "premix".

This premix was then pulverized and reblended for another 30 minutes during which 1845 Kgs of wheat starch were added in portions subsequent to which the total mix was thoroughly blended.

Selenium analysis by standard methods of three samples chosen at random from this batch of material displayed coefficients of variation of less than 3.0%.

EXAMPLE 2

The supplement of Example 1 which had a selenium content of 2000 p.p.m. was further diluted by blending with a further amount of wheat starch and a supplement having a selenium content of 200 p.p.m. obtained.

Selenium analysis in the manner disclosed in Example 1 showed that this supplement had an acceptable coefficient of variation of about 7%.

EXAMPLE 3

The supplement of Example 2 which had a selenium content of 200 ppm. was further diluted by blending with a further amount of wheat starch to provide a supplement having a selenium content of 30 ppm.

Selenium analysis in the manner disclosed in Example 1 showed that the supplement had an acceptable coefficient of variation of about 13.5%. This compares very favourably with the prior art figure of about 60% for a prior supplement having an equivalent selenium content as indicated by the prior art figures given above.

As can be seen, the coefficients of variation in the selenium content of the supplements of the present invention based on starch as the carrier material are significantly less than those for prior art supplements.

What is claimed is:

1. Process for the production of a solid livestock feed supplement comprising admixing a starch carrier in a solid form and a concentrated aqueous solution of a selenium-containing component for a period sufficient to produce a substantially homogeneous mixture, said feed supplement having a selenium content of not more than 5,000 ppm.

2. The process according to Claim 1 wherein the selenium-containing component is sodium selenate or sodium selenite, wherein a diluent is selected from the group consisting of corn grits, rye middlings, and a further amount of starch, and wherein a surfactant, a buffering agent or an additional nutritional trace element is present.

3. The process according to claim 2 wherein tricalcium phosphate is present and the starch carrier is wheat starch.

4. The process according to claim 1 wherein the livestock feed supplement has a selenium content of from 1,000 to 5.000 ppm.

5. The process according to claim 1 wherein the livestock feed supplement has a selenium content of from 100 to 500 ppm.